United States Patent
Huang et al.

(10) Patent No.: US 9,740,487 B2
(45) Date of Patent: Aug. 22, 2017

(54) METHOD AND APPARATUS FOR ASYNCHRONOUS PROCESSOR REMOVAL OF META-STABILITY

(71) Applicant: Huawei Technologies Co., Ltd., Shenzhen (CN)

(72) Inventors: Tao Huang, Ottawa (CA); Qifan Zhang, Lachine (CA); Wuxian Shi, Ottawa (CA); Yiqun Ge, Ottawa (CA); Wen Tong, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 163 days.

(21) Appl. No.: 14/480,522

(22) Filed: Sep. 8, 2014

(65) Prior Publication Data
US 2015/0074445 A1   Mar. 12, 2015

Related U.S. Application Data (60) Provisional application No. 61/874,794, filed on Sep. 6, 2013, provisional application No. 61/874,810, filed
(Continued)

(51) Int. Cl.
*G06F 9/30* (2006.01)
*G06F 15/76* (2006.01)
(Continued)

(52) U.S. Cl.
CPC .......... *G06F 9/30145* (2013.01); *G06F 1/08* (2013.01); *G06F 1/10* (2013.01); *G06F 9/3851* (2013.01);
(Continued)

(58) Field of Classification Search
CPC .......... G06F 1/08; G06F 1/10; G06F 9/30145; G06F 9/3851; G06F 9/3885; G06F 9/5011
(Continued)

(56) References Cited

U.S. PATENT DOCUMENTS 5,430,884 A   7/1995   Beard et al.
5,598,113 A   1/1997   Jex et al.
(Continued)

FOREIGN PATENT DOCUMENTS

EP   0335514 A2   3/1989
EP   0529369 A2   8/1992
(Continued)

OTHER PUBLICATIONS

Sutherland, Ivan E., "Micropipelines," Turing Award, Communication of the ACM, Voumne 32, No. 6, Jun. 1989, 16 papges.
(Continued)

*Primary Examiner* — Mark Connolly
(74) *Attorney, Agent, or Firm* — Slater Matsil, LLP (57) ABSTRACT

A clock-less asynchronous processing circuit or system having a plurality of pipelined processing stages utilizes self-clocked generators to tune the delay needed in each of the processing stages to complete the processing cycle. Because different processing stages may require different amounts of time to complete processing or may require different delays depending on the processing required in a particular stage, the self-clocked generators may be tuned to each stage's necessary delay(s) or may be programmably configured.

19 Claims, 6 Drawing Sheets

Related U.S. Application Data on Sep. 6, 2013, provisional application No. 61/874,856, filed on Sep. 6, 2013, provisional application No. 61/874,914, filed on Sep. 6, 2013, provisional application No. 61/874,880, filed on Sep. 6, 2013, provisional application No. 61/874,889, filed on Sep. 6, 2013, provisional application No. 61/874,866, filed on Sep. 6, 2013.

(51) Int. Cl.
   *G06F 1/08*   (2006.01)
   *G06F 1/10*   (2006.01)
   *G06F 9/38*   (2006.01)
   *G06F 9/50*   (2006.01)

(52) U.S. Cl.
   CPC .......... *G06F 9/3885* (2013.01); *G06F 9/5011* (2013.01)

(58) Field of Classification Search
   USPC .................................................. 712/18, 201
   See application file for complete search history.

(56) References Cited

U.S. PATENT DOCUMENTS

| | | | |
|---|---|---|---|
| 5,758,176 A | 5/1998 | Agarwal et al. | |
| 5,842,034 A | 11/1998 | Bolstad et al. | |
| 5,987,620 A | 11/1999 | Tran | |
| 6,108,769 A | 8/2000 | Chinnakonda et al. | |
| 6,633,971 B2 | 10/2003 | Peng et al. | |
| 6,658,581 B1* | 12/2003 | Takahashi ................. | G06F 1/10 706/13 |
| 7,313,673 B2 | 12/2007 | Abernathy et al. | |
| 7,353,364 B1 | 4/2008 | Chong et al. | |
| 7,376,812 B1 | 5/2008 | Sanghavi et al. | |
| 7,533,248 B1 | 5/2009 | Golla et al. | |
| 7,605,604 B1 | 10/2009 | Young | |
| 7,681,013 B1 | 3/2010 | Trivedi et al. | |
| 7,698,505 B2* | 4/2010 | Temple, III ......... | G06F 12/0815 711/119 |
| 7,752,420 B2* | 7/2010 | Izawa ................. | G06F 15/7867 712/15 |
| 7,936,637 B2 | 5/2011 | Shori | |
| 8,005,636 B2 | 8/2011 | Shipton et al. | |
| 8,125,246 B2 | 2/2012 | Grochowski et al. | |
| 8,307,194 B1 | 11/2012 | Scott et al. | |
| 8,464,025 B2 | 6/2013 | Yamaguchi et al. | |
| 8,689,218 B1 | 4/2014 | Awad et al. | |
| 2002/0124155 A1 | 9/2002 | Sami et al. | |
| 2002/0156995 A1 | 10/2002 | Martin et al. | |
| 2003/0065900 A1 | 4/2003 | Mes | |
| 2004/0046590 A1 | 3/2004 | Singh et al. | |
| 2004/0064750 A1 | 4/2004 | Conway | |
| 2004/0103224 A1 | 5/2004 | Duresky et al. | |
| 2004/0215772 A1 | 10/2004 | Dinker et al. | |
| 2005/0038978 A1 | 2/2005 | Nickolls et al. | |
| 2005/0251773 A1 | 11/2005 | Bair et al. | |
| 2006/0075210 A1 | 4/2006 | Manohar et al. | |
| 2006/0176309 A1 | 8/2006 | Gadre et al. | |
| 2006/0242386 A1 | 10/2006 | Wood | |
| 2006/0277425 A1 | 12/2006 | Renno et al. | |
| 2007/0150697 A1 | 6/2007 | Sachs | |
| 2007/0186071 A1 | 8/2007 | Bellows et al. | |
| 2008/0238494 A1 | 10/2008 | Ortiz et al. | |
| 2009/0217232 A1 | 8/2009 | Beerel et al. | |
| 2010/0278190 A1 | 11/2010 | Yip et al. | |
| 2010/0313060 A1 | 12/2010 | Bjorklund et al. | |
| 2011/0057699 A1 | 3/2011 | Szczypinski | |
| 2011/0072236 A1 | 3/2011 | Mimar | |
| 2011/0072238 A1 | 3/2011 | Mimar | |
| 2012/0066480 A1 | 3/2012 | Hanaki et al. | |
| 2012/0159217 A1 | 6/2012 | Venkataramanan et al. | |
| 2013/0024652 A1 | 1/2013 | Bailey et al. | |
| 2013/0080749 A1 | 3/2013 | Ito et al. | |
| 2013/0331954 A1 | 12/2013 | McConnell et al. | |
| 2013/0346729 A1 | 12/2013 | Barowski et al. | |
| 2014/0189316 A1 | 7/2014 | Govindu et al. | |
| 2014/0281370 A1 | 9/2014 | Khan | |
| 2015/0074443 A1* | 3/2015 | Huang .................. | G06F 9/3851 713/500 |
| 2015/0074446 A1* | 3/2015 | Tong ..................... | G06F 9/3851 713/502 |

FOREIGN PATENT DOCUMENTS

| | | |
|---|---|---|
| EP | 0328721 B1 | 4/1995 |
| WO | 2006055546 A2 | 5/2006 |

OTHER PUBLICATIONS

Berekovic et al., "A programmable co-processor for MPEG-4 video," Proceedings, IEEE International Conference on Acoustics, Speech, and Signal Processing, May 2001, pp. 1021-1024.

Wada et al., "A VLIW Vector Media Coprocessor With Cascaded SIMD ALUs," IEEE Transactions on Very Large Scale Integration (VLSI) Systems, vol. 17, No. 9, Sep. 2009, pp. 1285-1295.

IEEE 100 The Authoritative Dictionary of IEEE Standards Terms, 7th Ed., 2000, p. 252.

Hennessy, et al., "Computer Architecture a Quantitative Approach," (4th Ed. 2007), pp. 92-97, A-17, A-18, E-56-E-62.

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.

Laurence, "Introduction to Octasic Asynchronous Processor Technology," May 2012, IEEE 18th International Symposium on Asynchronous Circuits and Systems, pp. 113-117.

* cited by examiner

METHOD AND APPARATUS FOR ASYNCHRONOUS PROCESSOR REMOVAL OF META-STABILITY

CROSS REFERENCE TO RELATED APPLICATIONS

This application claims priority under 35 USC 119(e) to U.S. Provisional Applications Ser. Nos. 61/874,794, 61/874,810, 61/874,856, 61/874,914, 61/874,880, 61/874,889, and 61/874,866, all filed on Sep. 6, 2013, and all of which are incorporated herein by reference.

This application is related to:

U.S. patent application Ser. No. 14/480,491, entitled "METHOD AND APPARATUS FOR ASYNCHRONOUS PROCESSOR WITH FAST AND SLOW MODE" and filed on the same date herewith, and which is incorporated herein by reference;

U.S. patent application Ser. No. 14/480,573, entitled "METHOD AND APPARATUS FOR ASYNCHRONOUS PROCESSOR WITH AUXILIARY ASYNCHRONOUS VECTOR PROCESSOR" and filed on the same date herewith, and which is incorporated herein by reference;

U.S. patent application Ser. No. 14/480,561, entitled "METHOD AND APPARATUS FOR ASYNCHRONOUS PROCESSOR WITH A TOKEN RING BASED PARALLEL PROCESSOR SCHEDULER" and filed on the same date herewith, and which is incorporated herein by reference;

U.S. patent application Ser. No. 14/480,556, entitled "METHOD AND APPARATUS FOR ASYNCHRONOUS PROCESSOR PIPELINE AND BYPASS PASSING" and filed on the same date herewith, and which is incorporated herein by reference; and U.S. patent application Ser. No. 14/480,531, entitled "METHOD AND APPARATUS FOR ASYNCHRONOUS PROCESSOR BASED ON CLOCK DELAY ADJUSTMENT" and filed on the same date herewith, and which is incorporated herein by reference.

TECHNICAL FIELD

The present disclosure relates generally to asynchronous circuit technology, and more particularly, to a self-clocked circuit generating a clocking signal using a programmable time period.

BACKGROUND

High performance synchronous digital processing systems utilize pipelining to increase parallel performance and throughput. In synchronous systems, pipelining results in many partitioned or subdivided smaller blocks or stages and a system clock is applied to registers between the blocks/stages. The system clock initiates movement of the processing and data from one stage to the next, and the processing in each stage must be completed during one fixed clock cycle. When certain stages take less time than a clock cycle to complete processing, the next processing stages must wait—increasing processing delays (which are additive).

In contrast, asynchronous systems (i.e., clockless) do not utilize a system clock and each processing stage is intended, in general terms, to begin its processing upon completion of processing in the prior stage. Several benefits or features are present with asynchronous processing systems. Each processing stage can have a different processing delay, the input data can be processed upon arrival, and consume power only on demand.

Figure 1:
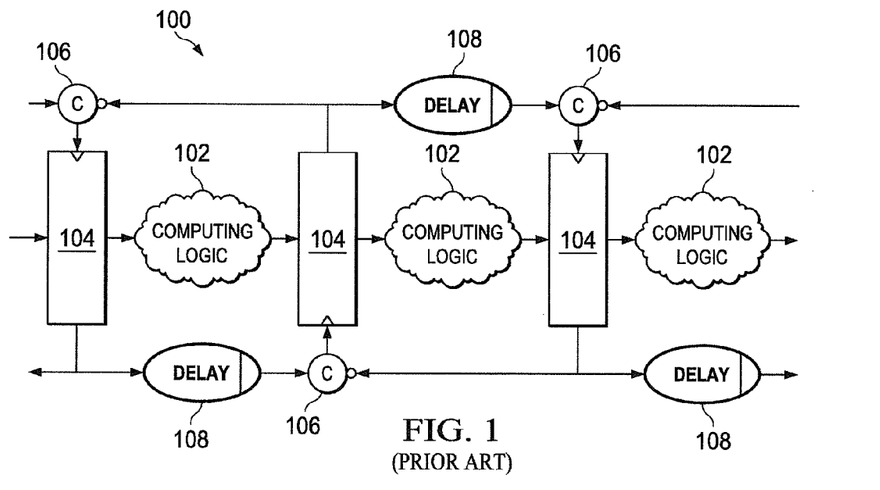
FIG. 1 illustrates a prior art asynchronous micro-pipeline architecture.

FIG. 1 illustrates a prior art Sutherland asynchronous micro-pipeline architecture 100. The Sutherland asynchronous micro-pipeline architecture is one form of asynchronous micro-pipeline architecture that uses a handshaking protocol built by Muller-C elements to control the micro-pipeline building blocks. The architecture 100 includes a plurality of computing logic 102 linked in sequence via flip-flops or latches 104 (e.g., registers). Control signals are passed between the computing blocks via Muller C-elements 106 and delayed via delay logic 108. Further information describing this architecture 100 is published by Ivan Sutherland in Communications of the ACM Volume 32 Issue 6, June 1989 pages 720-738, ACM New York, N.Y., USA, which is incorporated herein by reference.

Figure 2:
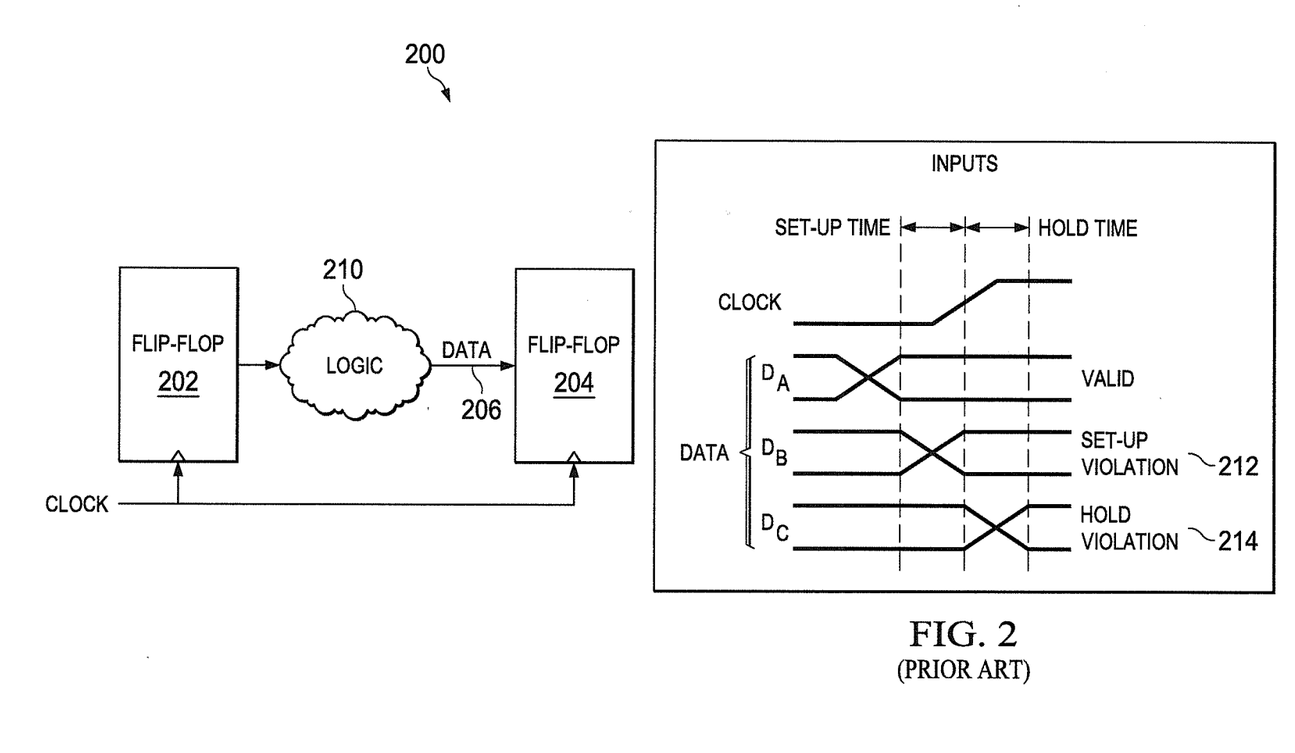
FIG. 2 is a block diagram illustrating the concept of meta-stability in a synchronous system.

Now turning to FIG. 2, there is illustrated a typical section or processing stage of a synchronous system 200. The system 200 includes flip-flops or registers 202, 204 for clocking an output signal (data) 206 from a logic block 210. On the right side of FIG. 2 there is shown an illustration of the concept of meta-stability. Set-up times and hold times must be considered to avoid meta-stability. In other words, the data must be valid and held during the set-up time and the hold time, otherwise a set-up violation 212 or a hold violation 214 may occur. If either of these violations occurs, the synchronous system may malfunction. The concept of meta-stability also applies to asynchronous systems. Therefore, it is important to design asynchronous systems to avoid meta-stability. In addition, like synchronous systems, asynchronous systems also need to address various potential data/instruction hazards, and should include a bypassing mechanism and pipeline interlock mechanism to detect and resolve hazards.

Accordingly, there are needed asynchronous processing systems, asynchronous processors, and methods of asynchronous processing that are stable, and detect and resolve potential hazards (i.e, remove meta-stability).

SUMMARY

According to one embodiment, there is provided a clock-less asynchronous processor including a processing pipeline having a plurality of successive processing stages. Each processing stage includes asynchronous logic circuitry configured to process input data and output processed data, and a data storage element coupled to the asynchronous logic circuitry and configured to receive and store the processed output data in response to a current stage active complete signal. A self-clocked generator configured to receive a previous stage active complete signal is also included in each stage to generate the current active complete signal in response thereto, and output the current active complete signal to the data storage element and to a next processing stage.

In another embodiment, there is provided a method of operating a clock-less asynchronous processor having a processing pipeline having a plurality of successive processing stages, where each processing stage includes asynchronous logic circuitry, a data storage element coupled to the output of the asynchronous logic circuitry and a self-clocked generator. The method includes receiving input data from a previous stage data storage element; receiving, at the self-clocked generator, a previous stage active complete signal; processing the received input data through the asynchronous logic circuitry and outputting processed data; generating a current active complete signal in response to the received previous stage active complete signal and transmitting the current stage active complete signal to a next successive processing stage; and storing the processed data in a current data storage element in response to the current stage active complete signal.

In another embodiment, there is provided a clock-less asynchronous processor including a plurality of processing pipelines each having a plurality of successive processing stages configured to operate asynchronously. The plurality of processing stages include a first, second and third processing stages. The first asynchronous processing stage includes first asynchronous logic circuitry configured to process first input data and output first processed data, a first data storage element coupled to the first asynchronous logic circuitry and configured to receive and store the first processed output data in response to a first stage active complete signal generated and output by a first self-clocked generator. The second asynchronous processing stage includes second asynchronous logic circuitry configured to process the first output processed data and output second processed data, a second data storage element coupled to the second asynchronous logic circuitry and configured to receive and store the second processed output data in response to a second stage active complete signal, and a second self-clocked generator configured to receive the first stage active complete signal, generate the second active complete signal in response thereto, and output the second stage active complete signal to the second data storage element. The third asynchronous processing stage includes third asynchronous logic circuitry configured to process the second output processed data and output third processed data, a third data storage element coupled to the third asynchronous logic circuitry and configured to receive and store the third processed output data in response to a third stage active complete signal, and a third self-clocked generator configured to receive the second stage active complete signal, generate the third stage active complete signal in response thereto, and output the third stage active complete signal to the third data storage element.

In still another embodiment, there is provided a clock-less asynchronous circuit including asynchronous logic circuitry configured to process input data and output processed data, and further configured to perform either a first processing function associated with a first processing delay or a second processing function associated with a second processing delay. The circuit further includes a data storage element coupled to the asynchronous logic circuitry and configured to receive and store the processed output data in response to an active complete signal, and a self-clocked generator configured to: receive a trigger signal, and generate and output the active complete signal after receiving the trigger signal, the active complete signal generated and output after a predetermined time period from receipt of the trigger signal, wherein the predetermined time period is substantially equal to or greater than the first processing delay when the asynchronous logic circuitry will perform the first processing function or the predetermined time period is substantially equal to or greater than the second processing delay when the asynchronous logic circuitry will perform the second processing function.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Asynchronous technology seeks to eliminate the need of synchronous technology for a global clock-tree which not only consumes an important portion of the chip power and die area, but also reduces the speed(s) of the faster parts of the circuit to match the slower parts (i.e., the final clock-tree rate derives from the slowest part of a circuit). To remove the clock-tree (or minimize the clock-tree), asynchronous technology requires special logic to realize a handshaking protocol between two consecutive clock-less processing circuits. Once a clock-less processing circuit finishes its operation and enters into a stable state, a signal (e.g., a "Request" or "Complete" signal) is triggered and issued to its ensuing circuit. If the ensuing circuit is ready to receive the data, the ensuing circuit sends a signal (e.g., an "ACK" signal) to the preceding circuit. Although the processing latencies of the two circuits are different and varying with time, the handshaking protocol ensures the correctness of a circuit or a cascade of circuits.

Hennessy and Patterson coined the term "hazard" for situations in which instructions in a pipeline would produce wrong answers. A structural hazard occurs when two instructions might attempt to use the same resources at the same time. A data hazard occurs when an instruction, scheduled blindly, would attempt to use data before the data is available in the register file.

Figure 3:
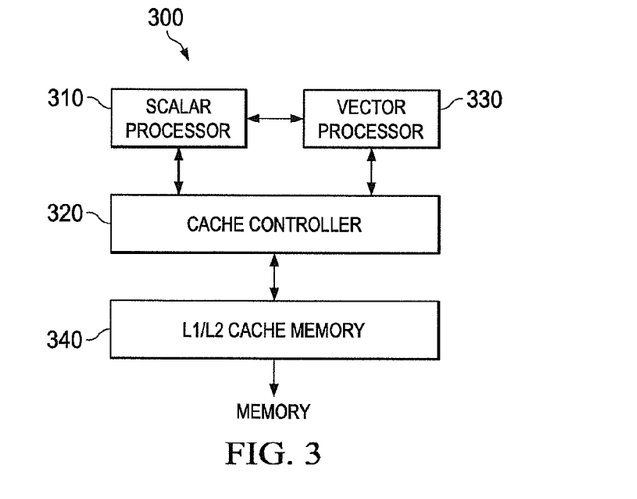
FIG. 3 illustrates an asynchronous processing system in accordance with the present disclosure.

With reference to FIG. 3, there is shown a block diagram of an asynchronous processing system 300 in accordance with the present disclosure. The system 300 includes an asynchronous scalar processor 310, an asynchronous vector processor 330, a cache controller 320 and L1/L2 cache memory 340. As will be appreciated, the term "asynchronous processor" may refer to the processor 310, the processor 330, or the processors 310, 330 in combination. Though only one of these processors 310, 330 is shown, the processing system 300 may include more than one of each processor. In addition, it will be understood that each processor may include therein multiple CPUs, control units, execution units and/or ALUs, etc. For example, the asynchronous scalar processor 310 may include multiple CPUs with each CPU having a desired number of pipeline stages. In one example, the processor 310 may include sixteen CPUs with each CPU having five processing stages (e.g., classic RISC stages—Fetch, Instruction Decode, Execute, Memory and Write Back). Similarly, the asynchronous vector processor 330 may include multiple CPUs with each CPU having a desired number of pipeline stages.

The L1/L2 cache memory 340 may be subdivided into L1 and L2 cache, and may also be subdivided into instruction cache and data cache. Likewise, the cache controller 320 may be functionally subdivided.

Aspects of the present disclosure provide architectures and techniques for a clock-less asynchronous processor architecture that utilizes a configurable self-clocked generator to trigger the generation of the clock signal and to avoid meta-stability problems.

Figure 4:
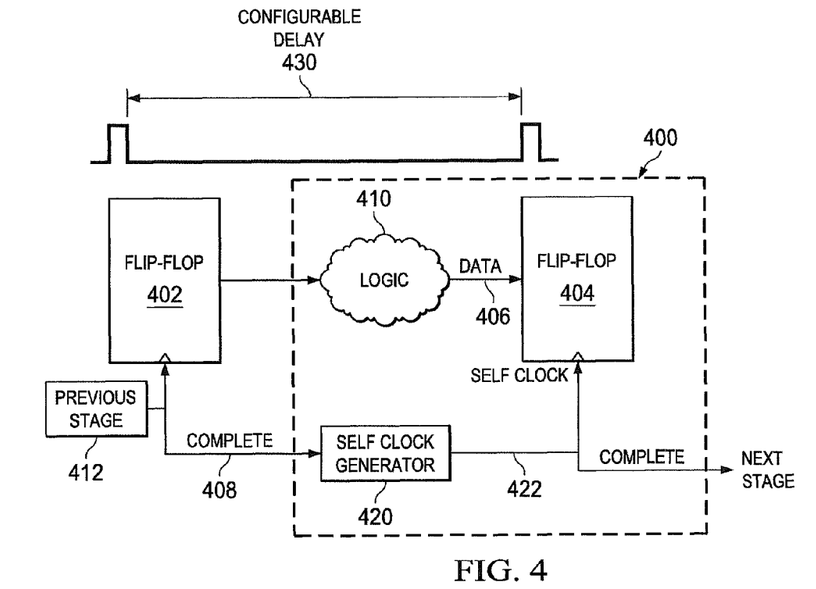
FIG. 4 is a block diagram illustrating a single asynchronous processing stage within an asynchronous processor in accordance with the present disclosure.

FIG. 4 illustrates a portion of a processing pipeline within the asynchronous processor 310 (or 330). The processing pipeline will include a plurality of successive processing stages. For illustrative purposes, FIG. 4 illustrates a single processing stage 400 within the pipeline. Each stage 400 includes a logic block 410 (or asynchronous logic circuitry), an associated self-clocked generator 420, and a data storage element or latch (or flip-flop or register) 404. In addition, a data latch (identified as 402) of a previous stage (identified as 412) is also shown. As will be appreciated for each stage, data processed by the respective logic block is output and latched into its respective data latch upon receipt of an active "complete" signal from the self-clocked generator associated with that stage. The logic block 410 may be any block or combination of processing logic configured to operate asynchronously as a unit or block. Some examples of such a block 410 may be an arithmetic logic unit (ALU), adder/multiplier unit, memory access logic, etc. In one example, which will be utilized hereafter to further explain the teachings and concepts of the present disclosure, the logic block 410 is a logic block configured to perform at least two different functions, such as an adder/multiplier unit. In this example, the logic block 410 has two processing time delays: the processing time required to complete the adding function and the processing time required to complete the multiplication function. In other words, the period of time between trigger and latching.

Data processed from the previous stage is latched into the data latch 402 (the previous stage has completed its processing cycle) in response to an active Complete signal 408. The Complete signal 408 (or previous stage completion signal) is also input to the next stage self-clocked generator 420 indicating that the previous stage 412 has completed processing and the data in the data latch 402 is ready for further processing by stage 400. The Complete signal 408 triggers the self-clocked generator 420 and activates self-clocked generation to generate its own current active Complete signal 422. However, the self-clocked generator 420 delays outputting the current Complete signal 422 for a predetermined period of time to allow the logic block 410 to fully process the data and output processed data 406.

The processing latency or delay of the logic block 410 depends on several factors (e.g., logic processing circuit functionality, temperature, etc.). One solution to this variable latency is to configure the delay to a delay value that is at least equal to, or greater than, than the worst case latency of the logic processing circuit 410. This worst case latency is usually determined based on latency of the longest path in the worst condition. In the example of the adder/multiplier unit, the required processing delay for the adder may be 400 picoseconds, while the required processing delay for the multiplier may be 1100 picoseconds. In such case, the worst case processing delay would be 1100 picoseconds. This may be calculated based on theoretical delays (e.g., by ASIC level simulation: static timing analysis (STA) plus a margin), or may be measured during a calibration stage, of the actual logic block circuits 410. Stage processing delay values for each stage 400 (and for each path/function in each stage 400) are stored in a stage clock delay table (not shown). During the initialization, reset or booting stage (referred to hereinafter as "initialization"), these stage delay values are used to configure clock-delay logic within the self-clocked generators 420. In one embodiment, the stage delay values in the table are loaded into one or more storage register(s) (not shown) for fast access and further processing when needed. In the example of the adder/multiplier, the values 400 and 1100 (or other indicators representative of those values) are loaded into the register.

During initialization, the self-clocked generator 420 is configured to generate and output its active Complete signal 422 at a predetermined period of time after receiving the previous Complete signal 408 from the previous stage 412. To ensure proper operation (processed data will be valid upon latching) the required processing delay will equal or exceed the time necessary for the block to complete its processing. Using the same example, then when the logic block is tasked with performing an adding function, the required processing delay should equal or exceed 400 picoseconds. Similarly, when the logic block is tasked with performing an adding function, the required processing delay should equal or exceed 1100 picoseconds. The self-clocked generator 1420 generates its Complete signal 1422 at the desired time which latches the processed output data 406 of logic block 410 into the data latch 404. At the same time, the current active Complete signal 422 is output or passed to the next stage.

Figure 5:
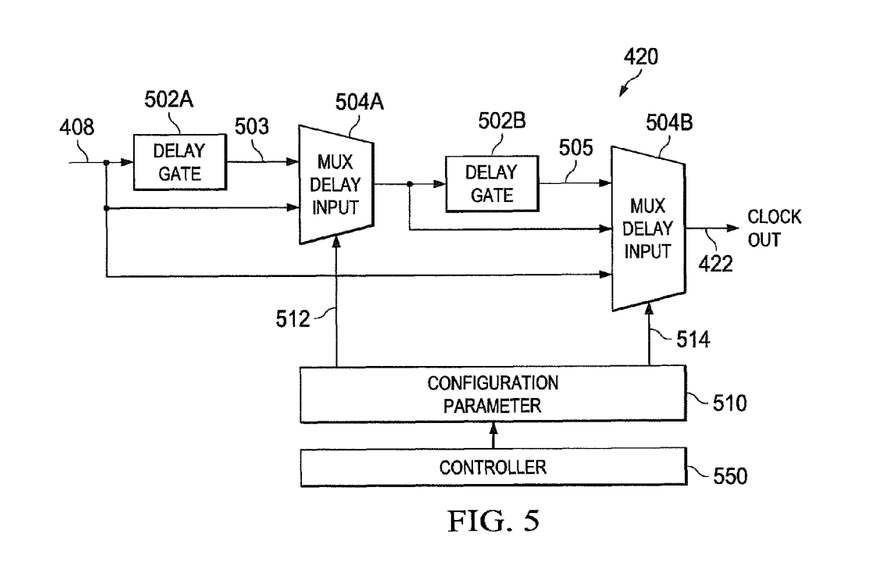
FIG. 5 is a block diagram of one implantation of the self-clocked generator shown in FIG. 4.

Now turning to FIG. 5, there is illustrated a more detailed diagram of the configurable or programmable self-clocked generator 420 of FIG. 4. The self-clocked generator 420 includes a first delay gate (or module or circuit) 502A, a second delay gate (or module or circuit) 502B, a first delay input multiplexor (mux) 504A and a second delay input multiplexer 504B. The multiplexors are configured to control an amount of delay between receipt of the previous Complete signal 408 and output (activation or assertion) of the current Complete signal 422. Thus, the self-clocked generator 420 is configured to control/program a predetermined amount of delay (or time period). In one embodiment, the programmed period is operation dependent.

A configuration parameter 510 controls operation of the multiplexors 504A, 504B to select a signal path for the previous Complete signal 408. This enables selection or configuration (programming) of when the clocking signal should be issued (i.e., how much delay)—a configurable amount of delay. For example, the first delay gate 502A may be configured to generate a signal 503 having added 500 picoseconds of delay, while the second delay gate 502B may be configured to generate a signal 505 having added 600 picoseconds of delay, for a possible total delay of 1100 picoseconds.

The configuration parameter 510 may be an N-bit select signal generated from the one or more storage registers (not shown) when the processor 310, 330 is initialized. Therefore, the select signal may select the first signal 503, the second signal 505, a combination of the first signal 503 and the second signal 505, or virtually no delay. In this example, the current Complete signal 422 may be generated and output with 0, 500, 600 or 1100 picoseconds of delay. For example, a first configuration parameter output 512 will cause the first multiplexor 504A to select and output either the delayed signal (500 picoseconds) 503 or the undelayed signal 408. Similarly, a second configuration parameter output 514 will cause the second multiplexor 504B to select and output either (1) the delayed signal 505 (which is either delayed by 500 or 1100 picoseconds), (2) the delayed signal (600 picoseconds) output from the multiplexor 504A, or (3) the undelayed signal 408. In general terms, the self-clocked generator 420 provides a programmable delay measured defined as the amount of time between receipt of the previous Clocking signal 408 and activation of the current Complete signal 422. Assertion of the Complete signal 422 latches the data and further signals the data is valid and ready for next stage processing.

In another embodiment, the configuration parameter 510 may generated by a controller 550. The controller 550 determines which processing function (e.g., adding or multiplying) the logic block 410 will perform and programs the self-clocked generator 420 to generate the clocking signal 422 with the "correct" delay for that processing function. In other words, the controller 550 programs the self-clocked generator to issue its clocking signal after a predetermined processing time has passed. This predetermined processing time is defined and associated with the function to be performed. Various methods and means may be utilized to determine a priori which function will be performed by the logic block 410. In one example, an instruction pre-decode indicates the particular processing function will be an add function or a multiply function. This information may be stored in a register or register file. Thus, the self-clocked generator 420 is programmed to generate the clocking signal 422 a predetermined amount of time after receipt of a previous clock signal (or other signal) signaling to the logic block 422 that the input data is ready for processing. This predetermined amount of time is programmed in response to a determination of what function the logic block 422 will perform.

While first and second delay gates, first and second multiplexors, and first and second configuration parameters have been described in the examples above for ease of explanation, it should be appreciated that additional delay gates (and differing delay times) and multiplexors may be utilized.

Figure 6:
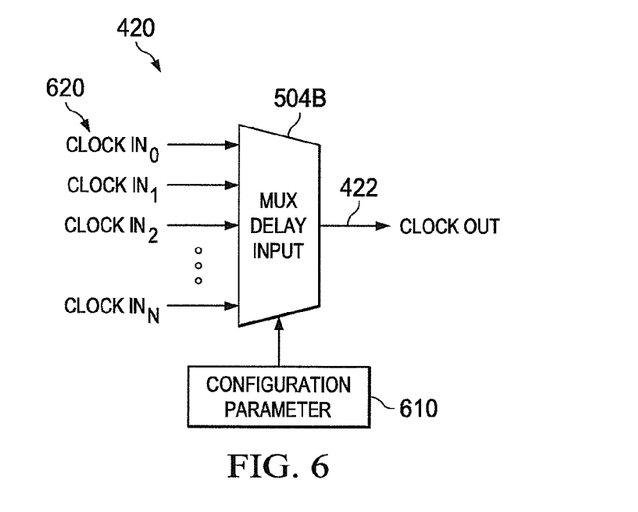
FIGS. 6 and 7 illustrate other implementations of the self-clocked generator shown in FIG. 4.

Now turning to FIG. 6, there is illustrated another implementation of the programmable delay self-clocked generator 420 having an M-to-1 multiplexer 600 with M clock input signals 620. Similar to the configuration parameter 510, an N-bit configuration parameter 610 (and/or a controller) controls multiplexer 600 to select one of the M clock inputs 620 for output of the current Complete signal 422. As will be appreciated, the clock input signals 620 are generated from the previous stage Complete signal (e.g., signal 408 in FIG. 5) and each are delayed by a different amount. The clock input signals are generated using any suitable configuration of clock delay gates/circuits (not shown). For example, if M=8, the eight clock input signals may be delayed in increments of 100 picoseconds beginning with 400 picoseconds. In such example, current Complete signal 422 can be selected to have a delay ranging from 400-1100 picoseconds, in increments of 100 picoseconds. It will be understood that any suitable number of clock input signals 620 and delay amounts can be configured and utilized.

Figure 7:
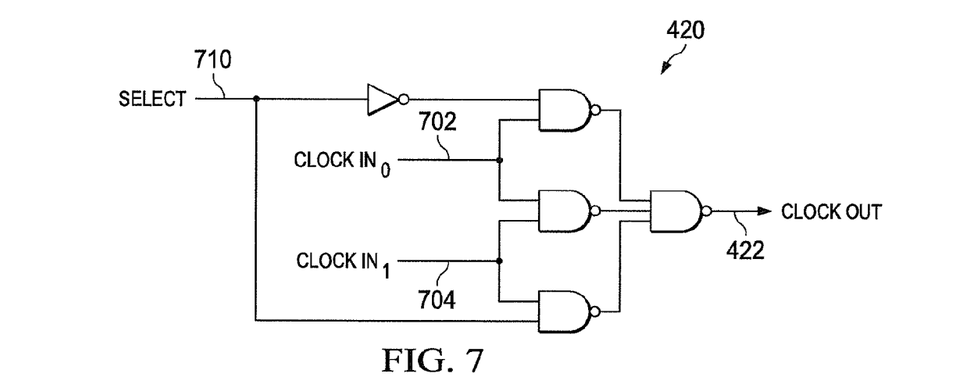

Now turning to FIG. 7, there is illustrated another implementation of the programmable delay self-clocked generator 420. In this configuration, the self-clocked generator 420 includes a number of logic gates (as shown) and two clock input signals 702, 704 configured to select and output one of the clock input signals. A single Select line 720 controls which clock input signal 702, 704 is selected and output as the clock output signal 422 (Complete signal).

Figure 8:
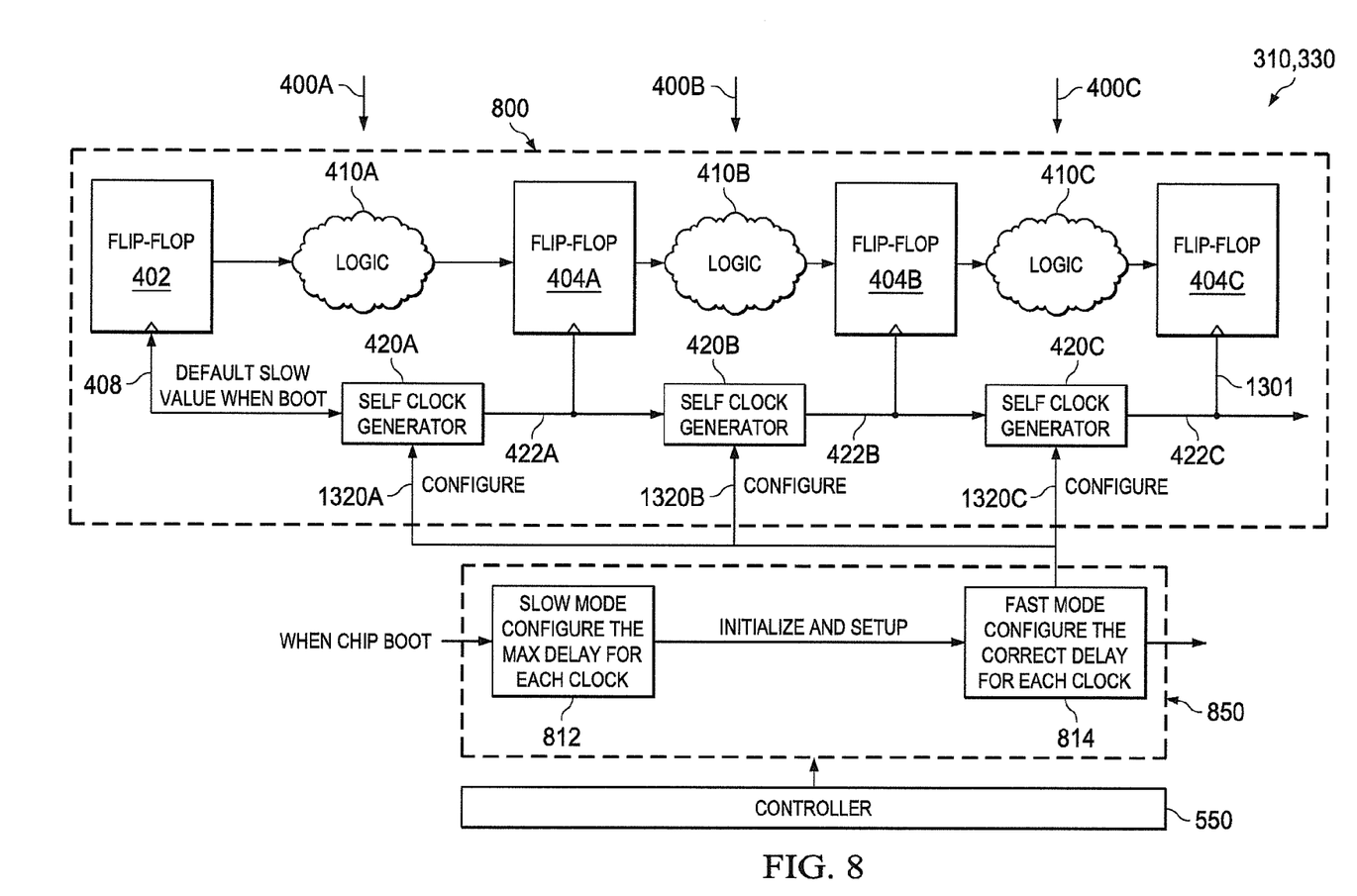
FIG. 8 is a block diagram illustrating a processing pipeline having multiple processing stages in accordance with the present disclosure.

Now turning to FIG. 8, there is illustrated a block diagram of a portion of a processing pipeline 800 having a plurality of processing stages within the asynchronous processor 310, 330. As will be appreciated, the pipeline 800 may have any number of desired stages 400. As an example only, the pipeline 800 may include 5 stages (with only 3 shown in FIG. 8) with each stage 400 providing different functionality (e.g., Instruction Fetch, Instruction Decode, Execution, Memory, Write Back). Further, the processor may include any number of separate pipelines 800 (e.g., CPUs or execution units).

As shown, the pipeline 800 includes a plurality of successive processing stages 400A, 400B, 400C. Each respective processing stage 400A, 400B and 400C includes a logic block (asynchronous logic circuitry) 410A, 410B and 410C, and associated self-clocked generators 420A, 420B and 420C and data latches 404A, 404B, 404C. Reference is made to FIG. 4 illustrating more details and operation of a stage 400.

As will be appreciated, each logic block 410A, 410B and 410C includes asynchronous logic circuitry configured to perform one or more processing functions on the input data. When data processing is complete (i.e., sufficient time has passed to complete processing), the processed data is latched into the data storage element or flip-flop 404A, 404B, 404C in response to the Complete signal 422A, 422B and 422C (which also indicates to a subsequent stage that processing is complete). Each intermediate successive stage 400 processes input data output from a previous stage.

The amount of processing time necessary for each logic block 410 to complete processing depends on the particular circuits included therein and the function(s) it performs. Each logic block 410A, 410B and 410C has one or more predetermined processing time delays which indicate the amount of time it takes to complete a processing cycle. As previously described, stage processing delay values for each stage 400 are stored in a stage clock delay table (not shown) and may be loaded into a data register or file during initialization.

For example only, the processing delays may be 500, 400 or 1100, and 600 or 800 picoseconds for stages 400A, 400*b*, 400C, respectively. This means that stage 400A is either capable of performing only one function (or has only one path) or can perform multiple functions, but each function requires about the same processing delay. Stages 400B, 400C are capable of performing at least two functions (or have at least two paths) with each function requiring a different processing delay.

Aspects of the present disclosure also provide architectures and techniques for a clock-less asynchronous processor that utilizes a first mode to initialize and set up the asynchronous processor during boot up and that uses a second mode during "normal" operation of the asynchronous processor.

With continued reference to FIG. 8, the processor 310, 330 includes mode selection (and delay configuration) logic 850. The mode selection circuit 850 configures the processor 310, 330 to operate in one of two modes. In one embodiment, these two modes include a Slow mode and a Fast mode. Additional modes could be configured if desired. It will be understood that the mode selection logic may be implemented using logic hardware, software or a combination thereof. The logic 850 configures, enables and/or switches the processor 310, 330 to operate in a given mode and switch between modes.

In the Slow mode, each self-clocked generator 420A, 420B, 420C is configured to generate its respective active Complete signal 422A, 422B, 422C with a maximum amount of delay (which may be the same or different for each stage). In the Fast mode, each self-clocked generator 420A, 420B, 420C is configured to generate its respective Complete signal 422A, 422B, 422C with a predetermined (or "correct") amount of delay (again, this may be the same or different for each stage, depending on functionality of the logic as well as different processing, voltage and temperature (PVT) corners). In general terms, the amount of delay in the Slow mode is greater than the amount of delay in the Fast mode and, therefore, the Fast mode performs processing at a faster speed.

Using the example above in which the processing delays are 500, 400 or 1100, and 600 or 800 picoseconds, for stages 400A, 400b, 400C, respectively, the Slow mode will initialize or program the self-clocked generators 420A, 420B, 420C for processing delays of 500, 1100 and 800 picoseconds. This ensures that each stage will be programmed with a sufficient processing delay amount to handle initialization procedures. The Fast mode enables each stage to operate in accordance with the procedures and methods described above—the processing delay for a stage will be programmed or set based on which particular function that respective logic block 410 will be performing at that time.

It will be understood there may be some hardware initialization/setup sequence(s) for which it may be desirable to operate in a slower mode to properly configure the logic. During slow mode, the delay can be set relatively large to ensure logic functionality and no meta-stability. Other examples may include applications for which the circuit speed should be slowed down, such as a special register configuration or process. As will be appreciated, different asynchronous logic circuits could be switched to faster speeds globally or locally (one by one).

Various factors may determine when the processor 310, 330 should operate in either one of the modes. These may include power consumption/dissipation requirements, operating conditions, types of processing, PVT corners, application real time requirements, etc. Different factors may apply to different applications, and any suitable determination of when to switch from one mode to another mode is within the knowledge of those skilled in the art. In other embodiments, the concepts described herein are broader, and may include switching between a first and second mode, switching between slow and fast modes, and having multiple modes (three or more). Multiple modes within normal operation may be provided, and may be implemented to vary core speeds and to adapt to different PVT or application real time requirement(s).

In one embodiment, the processor 310, 330 is configured to operate in the Slow mode during initialization and setup (e.g., boot, reset, initialization, etc.). After initialization is completed, the processor 310, 330 is configured to operate in the Fast mode—which is considered "normal" operation of the processor. The mode selection and configurable delay logic 850 includes a slow mode module 812 configured to generate a maximum delay for each of the self-clocked generators 420A-420C and a fast mode module 814 configured to generate a "correct" delay for each of the self-clocked generators 420A-420C. The maximum delay for a given self-clocked generator may be different than the maximum delay for another one of the self-clocked generators. Similarly, the "correct" delay(s) for a given self-clocked generator may be different than the "correct" delay(s) for another one of the self-clocked generators.

In one embodiment, the maximum delay for a given self-clocked generator 420 may be equal to a guaranteed delay without meta-stability+margin. For example, the configurable delay logic 850 may be configured to generate a slow mode configure signal corresponding to a slow mode delay value that is associated with a slowest speed at which the given self-clocked generator 420 can successfully process and operate. If it can perform multiple functions (or have multiple paths), the maximum processing delay for the logic block is the longest delay of the longest path of a given logic block 410 in the worst working condition. This may be measured at the wafer calibration stage for the given logic block 410 (or calculated theoretically). The configurable delay logic 850 is also configured to generate a fast mode configure signal that enables the logic block to operate in a "normal" mode—the processing delay for a stage will be programmed or set based on which particular function that respective logic block 410 will be performing at that time. Each of the self-clocked generators 420A-420C is configured to generate an active Complete signal 422A-422C in response to receipt of a corresponding delay configure signal 820A-820C from the delay logic 850.

During initialization of the processor 310, 330, the self-clocked generator 420A may receive the delay configure signal 820A and enter the slow mode during initialization and set up the processor. Alternatively, the self-clocked generator 420A may enter the slow mode by default during initialization. After completion of initialization, the self-clocked generator 420A may enter the fast mode for normal operation (in response to the delay configure signal 820A). The other self-clocked generators 420B, 420C may similarly operation in response to the delay configure signal 820B and delay configure signal 820C. Alternatively, these self-clocked generators may enter the slow mode by default during initialization, and after initialization and set up, they may enter the fast mode during normal operation (in response to the delay configure signals 820B, 820C).

During operation, the mode selection and configurable delay logic 850 is configured to generate a maximum delay such that asynchronous logic circuitry 410 executes in the first or slow mode during initialization. In a particular implementation, the slow mode may include a maximum delay for each of the self-clocked generators 420A-420C. A first flag may be written to a register or other memory location in the processor 310, 330 to maintain the slow mode until initialization is complete. Thereafter, the configurable delay logic 850 configures the self-clocked generators to generate "correct" delay(s) such that the asynchronous logic circuitry 410 executes in the second or fast mode during normal operation. Thus, in the embodiment described mainly in FIG. 8, the programmed processing delay (or period of time between trigger and latching) is mode dependent.

Figure 9A:
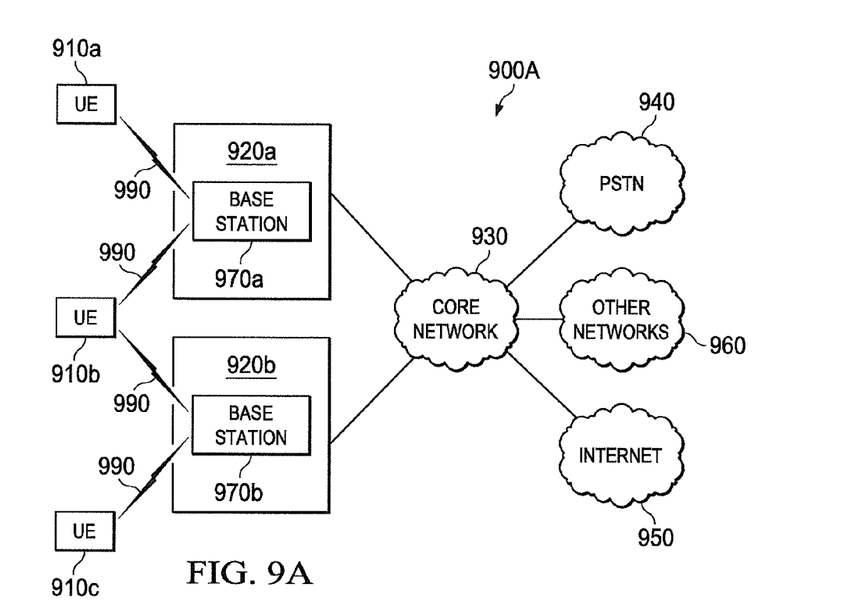
FIGS. 9A, 9B and 9C illustrate an example communication system, and example devices, in which the asynchronous processor and processing system may be utilized.

FIG. 9A illustrates an example communication system 300A that may be used for implementing the devices and methods disclosed herein. In general, the system 900A enables multiple wireless users to transmit and receive data and other content. The system 900A may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 900A includes user equipment (UE) 910a-910c, radio access networks (RANs) 920a-920b, a core network 930, a public switched telephone network (PSTN) 940, the Internet 950, and other networks 960. While certain numbers of these components or elements are shown in FIG. 9A, any number of these components or elements may be included in the system 900A.

The UEs 910a-910c are configured to operate and/or communicate in the system 900A. For example, the UEs 910a-910c are configured to transmit and/or receive wireless signals or wired signals. Each UE 910a-910c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 920a-920b include base stations 970a-970b, respectively. Each base station 970a-970b is configured to wirelessly interface with one or more of the UEs 910a-910c to enable access to the core network 930, the PSTN 940, the Internet 950, and/or the other networks 960. For example, the base stations 970a-970b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 9A, the base station 970a forms part of the RAN 920a, which may include other base stations, elements, and/or devices. Also, the base station 970b forms part of the RAN 920b, which may include other base stations, elements, and/or devices. Each base station 970a-970b operates to transmit and/or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the UEs 910a-910c over one or more air interfaces 990 using wireless communication links. The air interfaces 990 may utilize any suitable radio access technology.

It is contemplated that the system 900A may use multiple channel access functionality, including such schemes as described above. In particular embodiments, the base stations and UEs implement LTE, LTE-A, and/or LTE-B. Of course, other multiple access schemes and wireless protocols may be utilized.

The RANs 920a-920b are in communication with the core network 930 to provide the UEs 910a-910c with voice, data, application, Voice over Internet Protocol (VoIP), or other services. Understandably, the RANs 920a-920b and/or the core network 930 may be in direct or indirect communication with one or more other RANs (not shown). The core network 930 may also serve as a gateway access for other networks (such as PSTN 940, Internet 950, and other networks 960). In addition, some or all of the UEs 910a-910c may include functionality for communicating with different wireless networks over different wireless links using different wireless technologies and/or protocols.

Although FIG. 9A illustrates one example of a communication system, various changes may be made to FIG. 9A. For example, the communication system 900A could include any number of UEs, base stations, networks, or other components in any suitable configuration, and can further include the EPC illustrated in any of the figures herein.

Figure 9B:
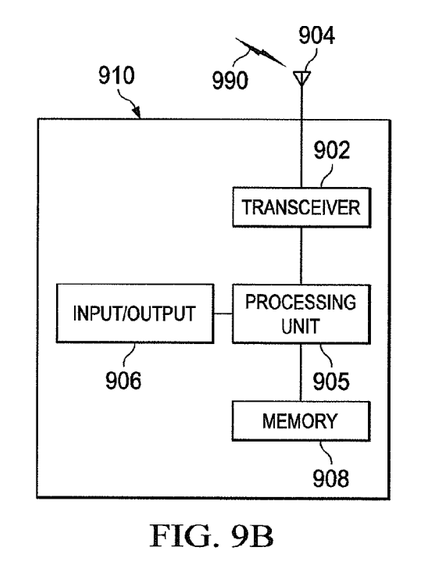
Figure 9C:
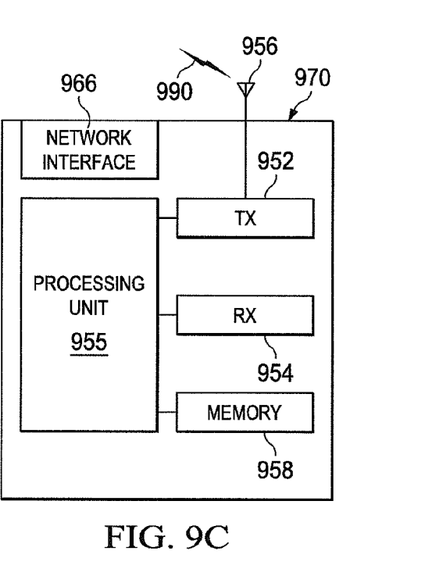

FIGS. 9B and 9C illustrate example devices that may implement the methods and teachings according to this disclosure. In particular, FIG. 9B illustrates an example UE 910, and FIG. 9C illustrates an example base station 970. These components could be used in the system 900A or in any other suitable system.

As shown in FIG. 9B, the UE 910 includes at least one processing unit 905. The processing unit 905 implements various processing operations of the UE 910. For example, the processing unit 905 could perform signal coding, data processing, power control, input/output processing, or any other functionality enabling the UE 910 to operate in the system 900A. The processing unit 905 also supports the methods and teachings described in more detail above. Each processing unit 905 includes any suitable processing or computing device configured to perform one or more operations. Each processing unit 905 could, for example, include a microprocessor, microcontroller, digital signal processor, field programmable gate array, or application specific integrated circuit. The processing unit 905 may be an asynchronous processor 310, 330 or the processing system 300 as described herein.

The UE 910 also includes at least one transceiver 902. The transceiver 902 is configured to modulate data or other content for transmission by at least one antenna 904. The transceiver 902 is also configured to demodulate data or other content received by the at least one antenna 904. Each transceiver 902 includes any suitable structure for generating signals for wireless transmission and/or processing signals received wirelessly. Each antenna 904 includes any suitable structure for transmitting and/or receiving wireless signals. One or multiple transceivers 902 could be used in the UE 910, and one or multiple antennas 904 could be used in the UE 910. Although shown as a single functional unit, a transceiver 902 could also be implemented using at least one transmitter and at least one separate receiver.

The UE 910 further includes one or more input/output devices 906. The input/output devices 906 facilitate interaction with a user. Each input/output device 906 includes any suitable structure for providing information to or receiving information from a user, such as a speaker, microphone, keypad, keyboard, display, or touch screen.

In addition, the UE 910 includes at least one memory 908. The memory 908 stores instructions and data used, generated, or collected by the UE 910. For example, the memory 908 could store software or firmware instructions executed by the processing unit(s) 905 and data used to reduce or eliminate interference in incoming signals. Each memory 908 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 9C, the base station 970 includes at least one processing unit 955, at least one transmitter 952, at least one receiver 954, one or more antennas 956, one or more network interfaces 966, and at least one memory 958. The processing unit 955 implements various processing operations of the base station 970, such as signal coding, data processing, power control, input/output processing, or any other functionality. The processing unit 955 can also support the methods and teachings described in more detail above. Each processing unit 955 includes any suitable processing or computing device configured to perform one or more operations. Each processing unit 955 could, for example, include a microprocessor, microcontroller, digital signal processor, field programmable gate array, or application specific integrated circuit. The processing unit 955 may be an asynchronous processor 310, 330 or the processing system 300 as described herein.

Each transmitter 952 includes any suitable structure for generating signals for wireless transmission to one or more UEs or other devices. Each receiver 954 includes any suitable structure for processing signals received wirelessly from one or more UEs or other devices. Although shown as separate components, at least one transmitter 952 and at least one receiver 954 could be combined into a transceiver. Each antenna 956 includes any suitable structure for transmitting and/or receiving wireless signals. While a common antenna 956 is shown here as being coupled to both the transmitter 952 and the receiver 954, one or more antennas 956 could be coupled to the transmitter(s) 952, and one or more separate antennas 956 could be coupled to the receiver(s) 954. Each memory 958 includes any suitable volatile and/or non-volatile storage and retrieval device(s).

Additional details regarding UEs 910 and base stations 970 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A clock-less asynchronous processing system, comprising:
   a processing pipeline having a plurality of successive processing stages, each processing stage comprising,
      asynchronous logic circuitry configured to process input data and output processed data,
      a data storage element coupled to the asynchronous logic circuitry and configured to receive and store the processed output data in response to a current stage active complete signal, and
      a self-clocked generator configured to receive a previous stage active complete signal, generate the current stage active complete signal in response thereto, and output the current stage active complete signal to the data storage element and to a next processing stage.

2. The processing system in accordance with claim 1 wherein the self-clocked generator is programmable and configured to delay the received previous stage active complete signal by a first predetermined delay in order to generate the current stage active complete signal.

3. The processing system in accordance with claim 2 wherein the first predetermined delay is programmable.

4. The processing system in accordance with claim 1 wherein the asynchronous logic circuitry includes a processing delay associated therewith, the processing delay representative of an amount of time required by the asynchronous logic circuitry to process the input data and output the processed data.

5. The processing system in accordance with claim 4 wherein the self-clocked generator is configured to delay the received previous stage active complete signal by a first predetermined delay in order to generate the current stage active complete signal, and wherein the first predetermined delay is in addition to the processing delay.

6. The processing system in accordance with claim 1 wherein the self-clocked generator is further configured to select one of a plurality of available clocking signals for output as the current stage active complete signal.

7. The processing system in accordance with claim 6 wherein the self-clocked generator comprises a multiplexer configured to:
   receive the plurality of available clocking signals;
   receive a configuration parameter signal operable for selecting one of the plurality of available clocking signals; and
   output the selected clocking signal.

8. The processing system in accordance with claim 7 wherein each of the plurality of available clocking signals is a delayed version of the previous stage active complete signal with a predetermined delay.

9. A method of operating a clock-less asynchronous processing system comprising a processing pipeline having a plurality of successive processing stages, each processing stage further comprising, asynchronous logic circuitry, a data storage element coupled to an output of the asynchronous logic circuitry and a self-clocked generator, the method comprising:
   receiving input data from a previous stage data storage element;
   receiving, at the self-clocked generator, a previous stage active complete signal;
   processing the received input data through the asynchronous logic circuitry and outputting processed data;
   generating a current stage active complete signal in response to the received previous stage active complete signal and transmitting the current stage active complete signal to a next successive processing stage; and
   storing the processed data in a current data storage element in response to the current stage active complete signal.

10. The method in accordance with claim 9 further comprising:
   outputting the current stage active complete signal after a first predetermined delay after receiving the previous stage active complete signal.

11. The method in accordance with claim 10 wherein the first predetermined delay is programmable.

12. The method in accordance with claim 9 a wherein the asynchronous logic circuitry includes a processing delay associated therewith, the processing delay representative of an amount of time required by the asynchronous logic circuitry to process the input data and output the processed data.

13. The method in accordance with claim 12 further comprising:
   delaying the received previous stage active complete signal by a first predetermined delay in order to generate the current stage active complete signal, and wherein the first predetermined delay is in addition to the processing delay.

14. The method in accordance with claim 9 further comprising:
   selecting, by the self-clocked generator, one of a plurality of available clocking signals for output as the current stage active complete signal.

15. The method in accordance with claim 14 wherein selecting further comprises
   receiving the plurality of available clocking signals;
   receiving a configuration parameter signal operable for selecting one of the plurality of available clocking signals; and
   outputting the selected clocking signal.

16. The method in accordance with claim 15 wherein each of the plurality of available clocking signals is a delayed version of the previous stage active complete signal with a predetermined delay.

17. A clock-less asynchronous processing circuit, comprising:
   a plurality of processing pipelines each having a plurality of successive processing stages configured to operate asynchronously, the plurality of successive processing stages comprising,
      a first asynchronous processing stage having first asynchronous logic circuitry configured to process first input data and output first processed data, a first data storage element coupled to the first asynchronous logic circuitry and configured to receive and store the first processed output data in response to a first stage active complete signal generated and output by a first self-clocked generator,
      a second asynchronous processing stage having second asynchronous logic circuitry configured to process the first output processed data and output second processed data, a second data storage element coupled to the second asynchronous logic circuitry and configured to receive and store the second processed output data in response to a second stage active complete signal, and a second self-clocked generator configured to receive the first stage active complete signal, generate the second stage active complete signal in response thereto, and output the second stage active complete signal to the second data storage element, and
      a third asynchronous processing stage having third asynchronous logic circuitry configured to process the second output processed data and output third processed data, a third data storage element coupled to the third asynchronous logic circuitry and configured to receive and store the third processed output data in response to a third stage active complete signal, and a third self-clocked generator configured to receive the second stage active complete signal, generate the third stage active complete signal in response thereto, and output the third stage active complete signal to the third data storage element.

18. The processing circuit in accordance with claim 17 wherein each of the second and third self-clocked generators is programmable and configured to delay the respective received first and second stage active complete signals by a predetermined delay in order to generate the respective second and third stage active complete signals.

19. A clock-less asynchronous circuit, comprising:
   asynchronous logic circuitry configured to process input data and output processed data, and further configured to perform either a first processing function associated with a first processing delay or a second processing function associated with a second processing delay;
   a data storage element coupled to the asynchronous logic circuitry and configured to receive and store the processed output data in response to an active complete signal; and
   a self-clocked generator configured to:
      receive a trigger signal,
      generate and output the active complete signal after receiving the trigger signal, the active complete signal generated and output after a predetermined time period from receipt of the trigger signal, and
      wherein the predetermined time period is substantially equal to or greater than the first processing delay when the asynchronous logic circuitry will perform the first processing function or the predetermined time period is substantially equal to or greater than the second processing delay when the asynchronous logic circuitry will perform the second processing function.

* * * * *

UNITED STATES PATENT AND TRADEMARK OFFICE
CERTIFICATE OF CORRECTION

PATENT NO. : 9,740,487 B2  
APPLICATION NO. : 14/480522  
DATED : August 22, 2017  
INVENTOR(S) : Tao Huang et al.

Page 1 of 1

It is certified that error appears in the above-identified patent and that said Letters Patent is hereby corrected as shown below:

In the Claims

In Column 14, Line 65, Claim 12, delete "claim 9 a" and insert --claim 9--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*